US010328315B2

(12) United States Patent
Hussain

(10) Patent No.: US 10,328,315 B2
(45) Date of Patent: Jun. 25, 2019

(54) SYSTEMS AND METHODS FOR PRODUCING A SPORTS BALL

(71) Applicant: Ali Hasnain Hussain, Sialkot (PK)

(72) Inventor: Ali Hasnain Hussain, Sialkot (PK)

( * ) Notice: Subject to any disclaimer, the term of this patent is extended or adjusted under 35 U.S.C. 154(b) by 0 days.

(21) Appl. No.: 16/173,363

(22) Filed: Oct. 29, 2018

(65) Prior Publication Data

US 2019/0099644 A1   Apr. 4, 2019

(51) Int. Cl.
*A63B 41/08* (2006.01)
*A63B 45/00* (2006.01)
*B29D 22/04* (2006.01)

(52) U.S. Cl.
CPC .............. *A63B 45/00* (2013.01); *A63B 41/08* (2013.01); *A63B 2243/0025* (2013.01); *B29D 22/04* (2013.01); *Y10T 29/49826* (2015.01)

(58) Field of Classification Search
CPC ......... A63B 37/02; A63B 41/02; A63B 41/04; A63B 41/10; A63B 2243/0025; B29D 22/04; Y10T 29/49826
USPC ................................................ 473/604, 600
See application file for complete search history.

(56) References Cited

U.S. PATENT DOCUMENTS

| | | | | |
|---|---|---|---|---|
| 6,039,662 A * | 3/2000 | Chan | ...... | A63B 41/08 473/599 |
| 9,186,559 B1 * | 11/2015 | Hussain | ...... | A63B 41/02 |
| 9,586,098 B1 * | 3/2017 | Ahsan | ...... | A63B 45/00 |
| 9,682,286 B2 * | 6/2017 | Shishido | ...... | A63B 41/08 |
| 9,919,189 B1 * | 3/2018 | Ahmed | ...... | A63B 41/08 |
| 10,112,082 B2 * | 10/2018 | Ahmed | ...... | A63B 41/08 |
| 2003/0228946 A1 * | 12/2003 | Chan | ...... | A63B 41/00 473/604 |
| 2009/0325745 A1 * | 12/2009 | Rapaport | ...... | A63B 39/00 473/604 |
| 2011/0253292 A1 * | 10/2011 | Chen | ...... | A63B 41/08 156/93 |
| 2012/0277043 A1 * | 11/2012 | Rodrigues | ...... | A63B 41/00 473/604 |
| 2014/0243124 A1 * | 8/2014 | McNamee | ...... | A63B 41/08 473/603 |
| 2016/0206929 A1 * | 7/2016 | Yuan | ...... | A63B 39/00 |

\* cited by examiner

*Primary Examiner* — Jason L Vaughan
(74) *Attorney, Agent, or Firm* — Bajwa IP Law Firm; Haris Zaheer Bajwa

(57) ABSTRACT

A method for manufacturing sports ball having a high-performance cover formed from a plurality of panels with foam provided internally.

7 Claims, 6 Drawing Sheets

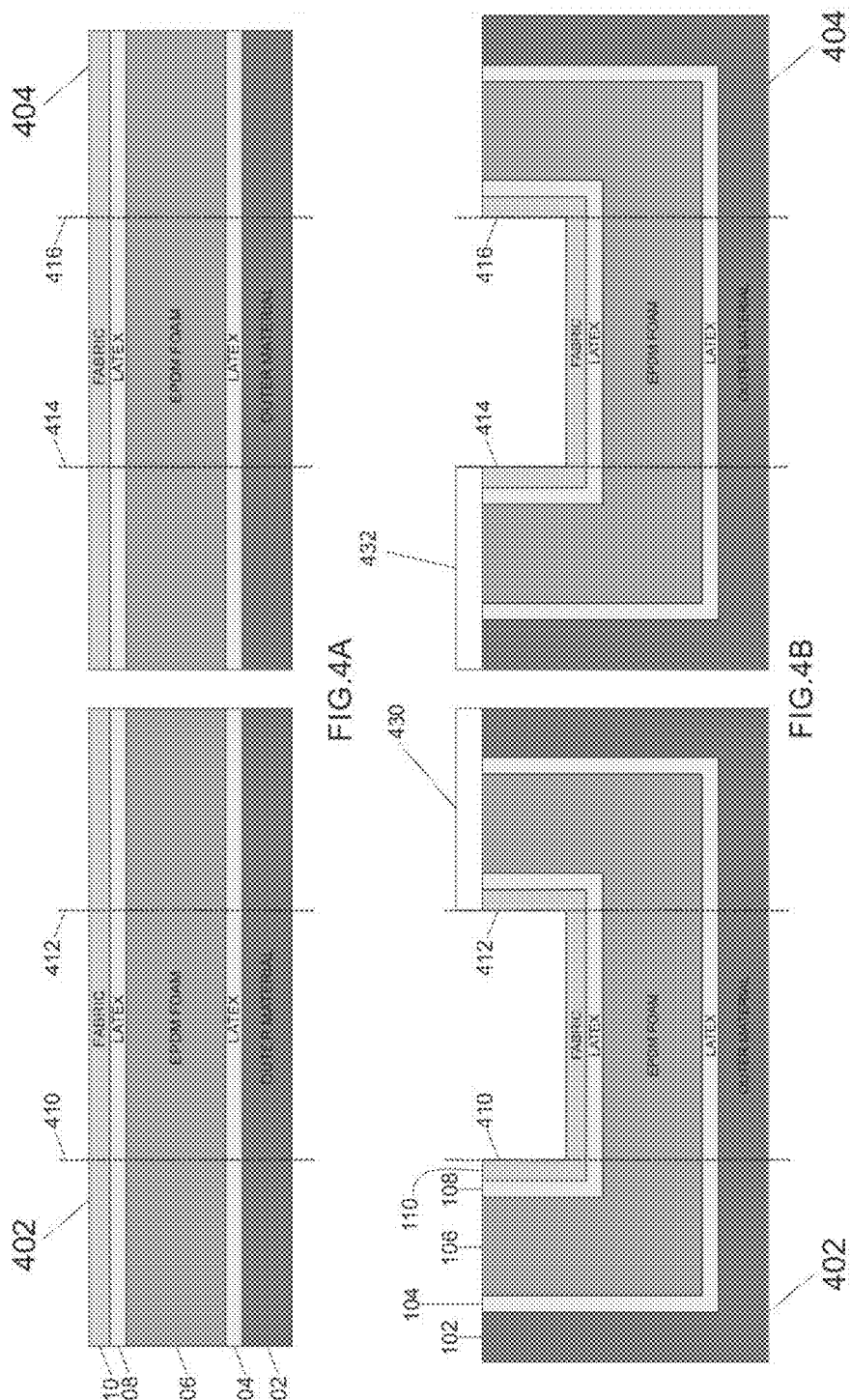

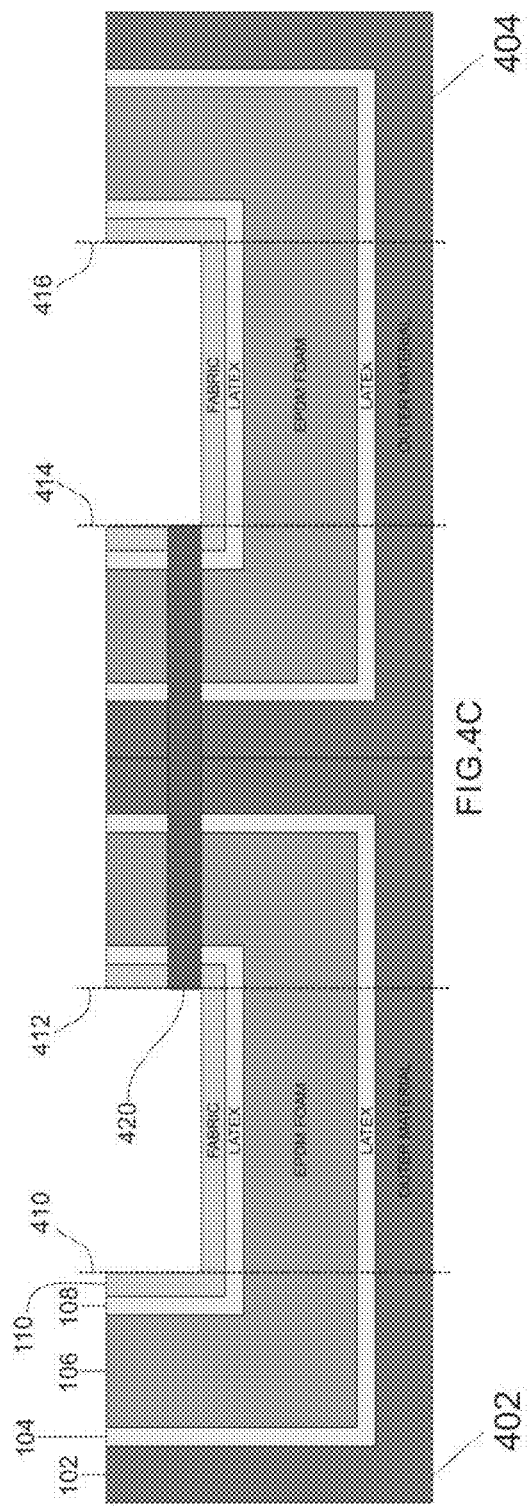

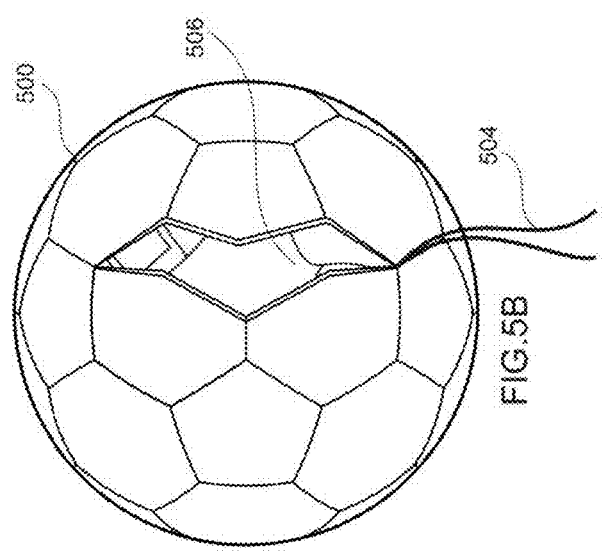
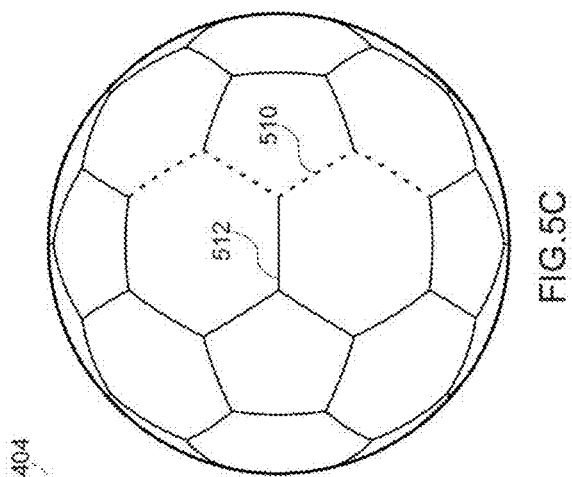
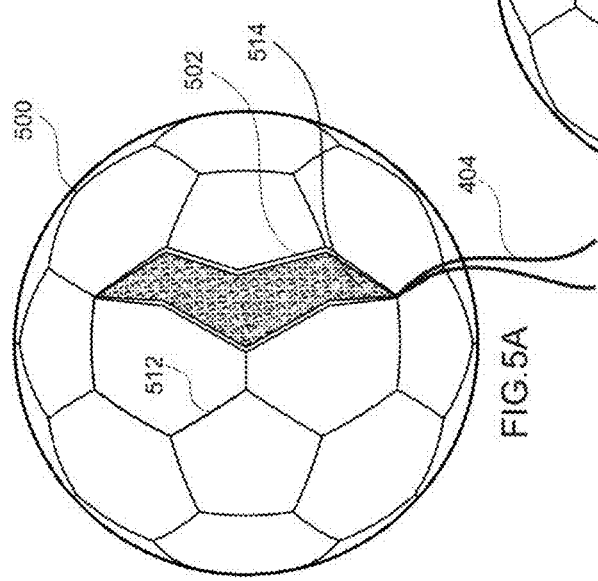

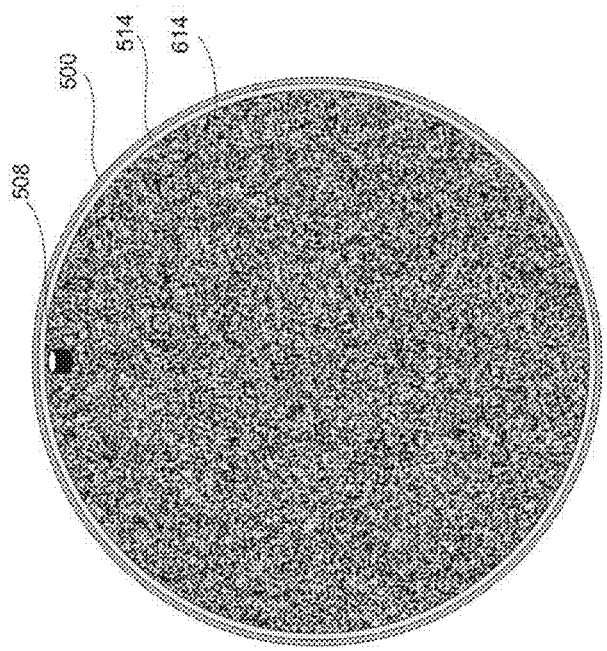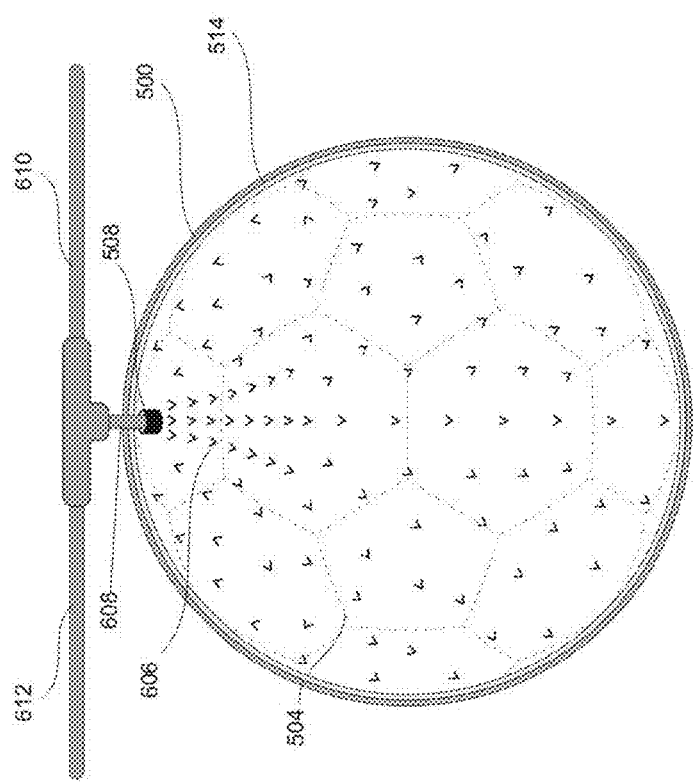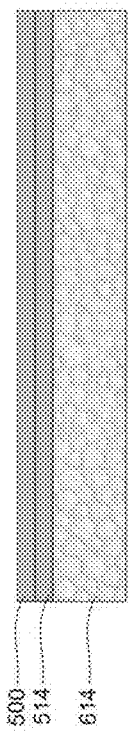

SYSTEMS AND METHODS FOR PRODUCING A SPORTS BALL

PRIORITY

This application claims the benefit of priority from Pakistan Patent Application Nos. 562/2017 (entitled "A Sports Ball Bladder") and 563/2017 (entitled "A Sports BALL"), both filed Oct. 30, 2017, which are hereby incorporated herein by reference in their entirety.

TECHNICAL FIELD

The present disclosure relates generally to a ball and a method for manufacturing a ball. More particularly, and without limitation, the present disclosure relates to structures and methods for manufacturing a sports ball.

BACKGROUND

Conventional hand stitched and thermo bonded sports balls with internal bladder polyester fillings have numerous drawbacks related to costs and performance. For example, conventionally filled balls are made by creating an opening at the bottom of a rubber bladder of a ball, then filling it with polyester wool or other fiber materials. Thereafter, the bladder is closed with a rubber patch. This is done to reduce the bounce of the ball. However, manufacturing a filled balled is both labor intensive and therefore costly. Furthermore, the opening or cut at the bottom of the sealed bladder makers it weaker and susceptible to air leaks.

Exemplary embodiments, consistent with the present disclosure, therefore aim to resolve the aforementioned problems, among others.

SUMMARY

An object of the invention is to provide a new and improved sports ball having a high performance, synthetic leather stitched or glued cover that exhibits softness while maintaining durability.

In an exemplary embodiment, a manufacturing method of a sports ball is provided. Exemplary methods include forming a cover of the sports ball. Forming the cover includes cutting outer layer cutouts from an outer layer for a plurality of panels, the outer layer consisting at least of a fabric and one of ethylene propylene diene monomer (EPDM) foam, Ethylene Vinyl Acteate (EVA), or synthetic leather, creating a bladder valve panel by inserting a valve in one of the outer layer cutouts and attaching a bladder to it, determining attachment lines on each of the outer layer cutouts, the attachments lines at a distance of 2 to 6 mm from edges of each of the outer layer cutouts, connecting the outer layer cutouts together using machine stitching or using glue at the attachment lines, inverting the cover inside out so that the bladder and respective inner surfaces of the outer layer cutouts are within the cover, and hand stitching or applying glue to any remaining unattached attachment lines. The method further includes placing the cover in a mold, forming a solid cellular foam within the bladder by inserting a plurality of liquids though the valve, the plurality of liquids comprising of polyol polyether and isocynates, and solidifying shape of the cover and the foam by applying heat to the cover in the mold.

BRIEF DESCRIPTION OF THE DRAWINGS

The accompanying drawings, which are incorporated in and constitute a part of this specification, illustrate exemplary embodiments of the present disclosure and, together with the description, serve to explain the principles of the disclosure.

FIGS. 4A-C illustrate an exemplary scenario for attaching two panels together, consistent with exemplary embodiments of the present disclosure;

FIGS. 5A-C illustrate some exemplary steps for attaching panels of a sports ball, consistent with exemplary embodiments of the present disclosure; and FIGS. 6A-C illustrate some exemplary steps for creating foam within a sports ball, consistent with exemplary embodiments of the present disclosure.

DETAILED DESCRIPTION

A sports ball is traditionally made up of two major components, a bladder for aft and a cover of panels. Embodiments consistent with the present disclosure enhance the performance of a sports ball by providing a method and structure for efficiently utilizing foam instead of air within a cover formed by attaching panels together. Specifically, exemplary embodiments provide for utilizing foam within a cover with or without the use of a balder. The foam mimics the performance and pressure of air while at the same time preventing deflation and impact on performance due to leakages.

Figure 1:
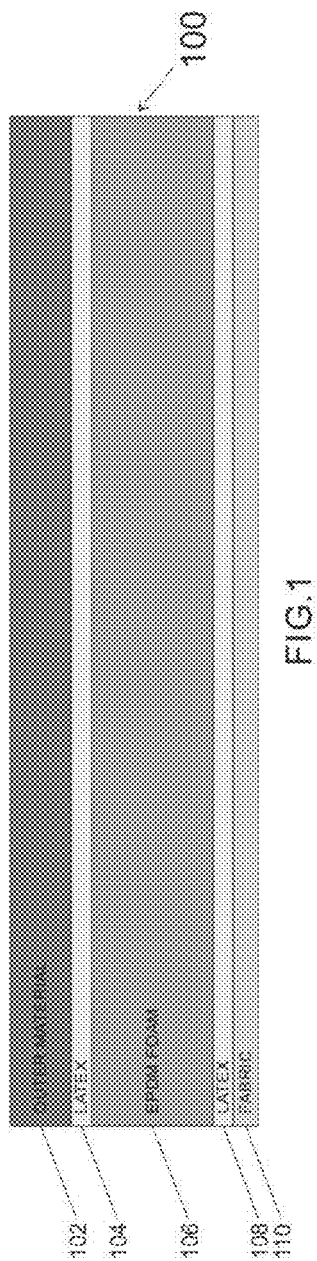
FIG. 1 shows a cross-section of materials comprising an outer layer of a sports ball, consistent with exemplary embodiments of the present disclosure.

FIG. 1 shows a cross-section of materials comprising an outer layer 100 for panels of a sports ball, consistent with exemplary embodiments of the present disclosure. Outer layer 100 may include an outer material sheet 102 which may be a layer of Polyvinyl Chloride (PVC), Polyurethane (PU), Ethylene Vinyl Acteate (EVA), or a similar synthetic material. Outer material sheet 102 may be laminated to a first layer of ethylene propylene diene monomer (EPDM) compound foam 106. In embodiments, outer material sheet 102 may have a thickness of 0.3-2.0 mm and foam 106 may have a thickness of 2-5 mm. The lamination may be completed using an adhesive 104, such as a latex adhesive. A thin layer of cloth or fabric 110 may then be attached on back of foam 106, using another layer of adhesive 108, such as a latex adhesive. In embodiments, fabric 110 may have a thickness of 0.3-1.0 mm. In embodiments, outer layer 100 may be heated and dried for a pre-determined period. For example, outer layer 100 may be dried at 55 degrees Celsius for up to one hour. In embodiments, total thickness of outer layer 100 may be 4.6-6 mm.

In exemplary embodiments, fabric 110 may not be utilized without deviating from the principles of exemplary embodiments of the present disclosure.

Figure 2:
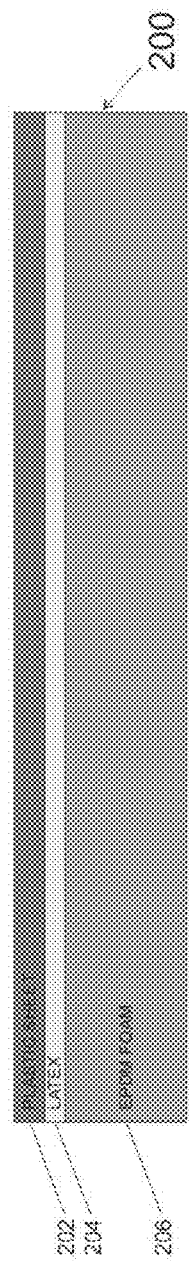
FIG. 2 shows a cross-section of materials comprising another outer layer of a sports ball, consistent with exemplary embodiments of the present disclosure.

FIG. 2 shows a cross-section of materials comprising an outer layer 200 for panels of a sports ball, according to an embodiment of the present disclosure outer 200 may include EPDM compound foam 206. In embodiments, EPDM foam 206 may have a thickness of 2-3 mm. In additional embodiments, a thickness of EPDM foam 206 may be dependent on the texture of the material and its ability to expand under compression. For example, as will be apparent later, foam 206 may need to expand a certain distance when compression is applied, therefore a particular thickness will be needed for foam 246 to expand a certain distance when a particular amount of pressure and/or heat is applied. Foam 206 may be laminated to plastic sheet 202 using adhesive layer 204, such as a latex adhesive. In embodiments, plastic sheet 202 may be polyethylene or polypropylene. In embodiments, total thickness of inner layer 200 may be 0.45-0.55 mm.

In an exemplary embodiment, outer layers may simply be formed by an exemplary Ethylene Vinyl Acteate (EVA), thermoplastic polyurethane (TPU), Polyvinyl Chloride (PVC), or any synthetic leather, which may be laminated with latex or synthetic glue. This may then to laminated to a layer of cloth or fabric to form the outer layer. The exemplary cloth or fabric may strengthen the ball cover material.

Figure 3A:
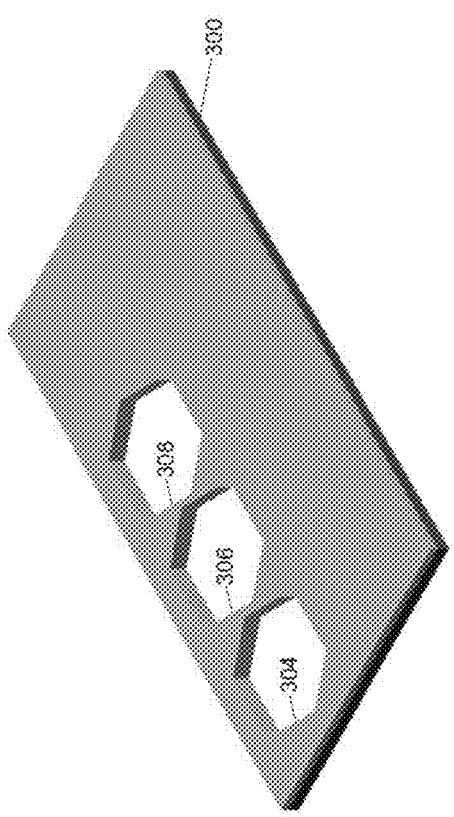
FIGS. 3A and 3B are illustrations of an exemplary scenario for cutting out panel shapes, consistent with exemplary embodiments of the present disclosure.
Figure 3B:
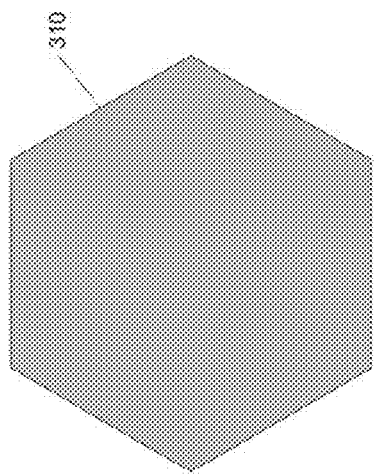

FIGS. 3A and 3B are illustrations of an exemplary scenario for cutting out panel shapes, according to an embodiment of the present disclosure. As shown in FIG. 3A, required panel shapes (304, 306, and 308) may be cut from layer 300 using conventional ball cutting knives. FIG. 3B illustrates an exemplary cutout 310 that may be cut from layer 300. In this exemplary scenario, cutout 310 may represent a cutout of outer layer 100. Cutout 310 is hexagon shaped to form a hexagon shaped panel.

FIG. 4A-4D are cross-sections of exemplary steps in the forming of panels of a sports ball, consistent with embodiments of the present disclosure. One of ordinary skill in the art will comprehend, that the elements illustrated within FIGS. 4A-4D are not drawn to scale. Instead, they have been illustrated in sizes that allow for easier comprehension.

FIG. 4A illustrates two cutouts 402 and 404 side-by-side. In an exemplary embodiment, cutouts 402 and 404 may be cutouts from outer layer 100. Accordingly, cutouts 402 and 404 may be respective cutouts of respective layers of fabric 110, adhesive 108, foam 106, adhesive 104, and outer material 102. Attachment lines 410, 412, 414, and 416 may represent locations on cutouts 402 and 404 where stitching or glue may be applied. Each cutout of outer layer 100 may contain attachment lines similar to attachment lines 410, 412, 414, 416 illustrated on cutouts 402 and 404. In an exemplary embodiment, the stitch lines may be a predetermined distance from the edges of cut outs of outer layer 100.

FIG. 4B illustrates stitch regions 430 and 432 of the two cutouts 402 and 404 turned up. Stitch regions may refer to regions from respective attachment lines to respective edges of cutouts of the outer layer 100. For example, from attachment lines 410, 412, 414, and 416 to edges of cutouts 402 and 404. In embodiments, an aspect of the step illustrated in FIG. 4B is that the stitch regions of two cutouts are placed next to each other for stitching so that they may be stitched together at attachment lines 412 and 414. In embodiments, two respective cut outs necessarily do not need to be flat side-by-side, rather, in a position where two cutouts may be stitched together at attachment lines. In embodiments, an aspect of the step illustrated in FIG. 4B-4D is that the stitching is applied at respective attachment lines 412 and 414 with surfaces of the respective outer material 102 being in contact with each other. Accordingly, after all panels are stitched together, any machine stitching may be contained within a sports ball. Additionally, fabric layers (fabric 110) may also be contained within the ball, as is apparent by the additional description provided in the disclosure.

FIG. 4C illustrates stitching 420 at attachment lines 412 and 414 that stitches together cutouts 402 and 404. Stitching 420 may be applied to all attachment lines of a cutout for a first panel with cutouts for various other panels. For example, a hexagonal shaped cutout may be stitched together with six other cutouts, each of the six cutouts forming parts of six respective panels of a sports ball. In embodiments, stitching material may be high strength polyester, or polyester cotton mix high strength applied by a stitching machine, such as a high tension stitching machine. A high tension stitching machine may apply very high tension on a thread enabling the stitches to be invisible on the outer shell of a manufactured sports ball.

In an exemplary embodiment, any two set of panels may be attached using either stitching or thermobonding utilizing attachment lines.

In an exemplary embodiment, a valve may be attached to one of the panel cutouts to form an exemplary valve panel. For balls with bladders, an exemplary bladder may be attached to an exemplary valve (which is attached to an exemplary cutout), thereby forming an exemplary bladder valve panel. In an exemplary embodiment, bladder may be simply a bag with a round shape. The bladder may also be any molded rubber or butyl or synthetic rubber that may be wound with polyester or nylon threads. In embodiments, exemplary bladder may be molded rubber or butyl bladder or synthetic rubber that may be laminated with polyester or polyester cotton cloth strips. In embodiments, additional bladders, with restricted circumference properties may be used.

In exemplary embodiments, most of the cutouts of outer layer 100 for the panels may be machine-stitched together or attached together utilizing glue, with the fabric layers 110 being exposed on the outside of the sports ball when machine stitching or flue is being applied. Then, after cutouts of inner layer 100 are attached, the ball may be inverted inside out, where the bladder is contained within the sports ball. Hand stitching or additional glue may then be applied to any remaining unattached panel edges. In embodiments, only an amount of panels edges are left for hand stitching or further attachment that are needed to invert a sports ball inside out so that the bladder is contained within the stitched-together panels. In embodiments, a length of panel edges where the cover may be closed after inversion may be four to six inches.

FIGS. 5A-C illustrate some exemplary steps for stitching panels of a sports ball, consistent with exemplary embodiments of the present disclosure. FIG. 5A illustrates sports ball cover 500 with various panels. Numerous panels and/or panel edges of sports ball 1000 are stitched together using machine stitching 512 as discussed above with respect to FIGS. 4A-4C. A cavity 502 exposing bladder 514 may be hand-stitched using string 1004. FIG. 5B illustrates a second stage of hand stitching where panels are pulled closer together and string 504 may be being applied at exemplary position 506. FIG. 5C illustrates a completed stitched sports ball cover 500 with majority of the panels and/or panel edges being stitched together by applying machine stitching 512. Four panel edges are stitched together using hand stitching 510.

In an exemplary embodiment, an analogous process may be applied for gluing the panels together instead of stitching them together. That is, the panels are attached together utilizing glue. Then, they are inverted and the glue is applied to the unattached components. In a gluing process, glue and heat are applied, and the process may be referred to as thermobonding. In embodiments, when no bladder is utilized, the exemplary process for attaching panels to each other is the same.

In exemplary embodiments, once the stitching or thermobonding is complete and the cover is finished, foam is created within the cover. In exemplary embodiments, when a bladder is attached to a bladder valve panel, the bladder will be completely internal to the cover.

In an exemplary embodiment, the cover may then be inserted in a mold (not illustrated-but corresponding with the desired shape of a sports ball), with an opening aligned to the valve. In an exemplary embodiment, the mold may be a heated molding machine which is in the finalized shape of a sports ball. Accordingly, in an exemplary embodiment, a specialized injection machine may be utilized to insert two liquids into the cover 500. Exemplary liquids may be designed to react automatically with each other to form cellular foam filing the cavity within an exemplary bladder or directly the cover of a sports ball. Accordingly, in the pressurized mold, a sports ball (and the foam within it) is given its based on an exemplary mold shape.

In an exemplary embodiment, polyurethane foam may be formed by mixing polyol polyether and isocynates in a mixing ration of 3:1 to 1:1. For example, as illustrated in FIG. 6A, injection device 608 may be inserted into valve 508. Part 612 may be utilized to insert polyether and part 614 may be utilized to insert isocyantes. In the exemplary embodiment illustrated in FIG. 6A, cover 500 is lined by bladder 514. Combined liquids 606 mix throughout the cavity within the cover 500. In an exemplary embodiment, the exemplary isocyanates may be toluene diisocyanate (TDI) or polymeric isocyanate (PMDI). TDI is produced by chemically adding nitrogen groups on toluene, reacting these with hydrogen to produce a diamine, and separating the undesired isomers. As the liquids mix, polyutharene foam 614 forms, as illustrated in FIG. 6B. A cross-section of near the surface of an exemplary soccer ball is illustrated in FIG. 6C. In an exemplary embodiment, when no bladder is utilized, the cross-section would simply entail cover 500 and polyutharene foam 614, with polyutharene foam 614 filling out all crevices within the internal surface of cover 500.

In an exemplary embodiment, foam formed within a sports ball may allow the exemplary sports ball to behave as desired for futsal, handball, volleyball, basketball and any sports. In an exemplary embodiment, if an exemplary bladder is utilized within an exemplary sports ball, then the exemplary bladder may be inflated to between two and nine pounds per square inch (psi). Accordingly, air may be injected which may pass through an open cell structure of the foam uniformly spreading through the ball to enhance outward pressure in combination with the foam. Such a combination may allow for excellent and controllable results in terms of performance. Accordingly, the stability provided by exemplary foam and fine tuning by air allows for more competitive and efficient performance by the sports balls.

In an exemplary embodiment, heating may be applied within a mold the cover and foam within the cover to form a sports ball. This may aid in providing a permanent shape to a sports ball. In some embodiments, the sports ball may be molded at between 25 to 35 degrees Celsius for thirty seconds to sixty seconds.

In embodiments, the exemplary manufacturing methods provide for a robust sports ball where the foam provides a foam support structure and existing in space in lieu of air but providing a high amount of performance as foam may not leak or lose pressure, as with sports ball containing air.

In embodiments, exemplary sports balls manufactured according to exemplary methods aid in reducing manufacturing costs significantly, while at the same time, the ball rebounds, has water resistance/absorption, and has abrasion properties that are superior to the characteristics of current hand stitched and thermo bonded balls. Furthermore, the ability to transport these balls while they are deflated also leads to numerous commercial advantages such as significant reduction of cost compared to transportation of thermo bonded balls.

In some embodiments, the exemplary methods of manufacturing a sports ball may be applied in any types of balls that utilize panels and/or bladders, such as footballs, rugby balls, volleyballs, water polo balls, handballs, etc.

What is claimed:

1. A manufacturing method of a sports ball, comprising the steps of:
   forming a cover of the sports ball, comprising:
   a. cutting outer layer cutouts from an outer layer for a plurality of panels, the outer layer consisting at least of a fabric and one of ethylene propylene diene monomer (EPDM) foam, Ethylene Vinyl Acteate (EVA), or synthetic leather;
   b. creating a bladder valve panel by inserting a valve in one of the outer layer cutouts and attaching a bladder to it;
   c. determining attachment lines on each of the outer layer cutouts, the attachments lines at a distance of 2 to 6 mm from edges of each of the outer layer cutouts;
   d. connecting the outer layer cutouts together using machine stitching or using glue at the attachment lines;
   e. inverting the cover inside out so that the bladder and respective inner surfaces of the outer layer cutouts are within the cover; and
   f. hand stitching or applying glue to any remaining unattached attachment lines;
   placing the cover in a mold;
   forming a solid cellular foam within the bladder by inserting a plurality of liquids though the valve, the plurality of liquids comprising of polyol polyether and isocynates; and
   solidifying shape of the cover and the foam by applying heat to the cover in the mold.

2. The method of claim 1, further comprising:
   inserting air with a pressure of two to nine pounds per square inch with the cover.

3. The method of claim 2, wherein forming the solid cellular foam within the bladder by inserting the plurality of liquids though the valve comprises inserting the polyol polyether and the isocyanates with the mixing ratio of 3:1.

4. The method of claim 1, wherein forming the solid cellular foam within the bladder by inserting the plurality of liquids though the valve comprises inserting the polyol polyether and the isocyanates with a mixing ratio in a range of 1:1 to 3:1.

5. A manufacturing method of a sports ball, comprising the steps of:
   forming a cover of the sports ball, comprising:
   a. cutting outer layer cutouts from an outer layer for a plurality of panels, the outer layer consisting at least of a fabric and one of ethylene propylene diene monomer (EPDM) foam, Ethylene Vinyl Acteate (EVA), or synthetic leather;
   b. creating a valve panel by inserting a valve in one of the outer layer cutouts;
   c. determining attachment lines on each of the outer layer cutouts, the attachments lines at a distance of 2 to 6 mm from edges of each of the outer layer cutouts;

d. connecting the outer layer cutouts together using machine stitching or using glue at the attachment lines;

e. inverting the cover inside out so that respective inner surfaces of the outer layer cutouts are within the cover; and f. hand stitching or applying glue to any remaining unattached attachment lines;

placing the cover in a mold;

forming a solid cellular foam within the cover by inserting a plurality of liquids though the valve, the plurality of liquids comprising of polyol polyether and isocynates; and solidifying shape of the cover and the foam by applying heat to the cover in the mold.

6. The method of claim 5, wherein forming the solid cellular foam within the cover by inserting the plurality of liquids though the valve comprises inserting the polyol polyether and the isocyanates with a mixing ratio in a range of 1:1 to 3:1.

7. The method of claim 6, wherein forming the solid cellular foam within the cover by inserting the plurality of liquids though the valve comprises inserting the polyol polyether and the isocyanates with the mixing ratio of 3:1.

\* \* \* \* \*